United States Patent
Pallett et al.

(10) Patent No.: US 7,627,418 B2
(45) Date of Patent: Dec. 1, 2009

(54) SYSTEM AND METHOD TO CONTROL ENGINE DURING DE-SULPHURIZATION OPERATION IN A HYBRID VEHICLE

(75) Inventors: Tobias Pallett, Farmington Hills, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 423 days.

(21) Appl. No.: 11/243,794

(22) Filed: Oct. 4, 2005

(65) Prior Publication Data

US 2007/0078586 A1 Apr. 5, 2007

(51) Int. Cl.
*F02B 75/06* (2006.01)
*G06F 19/00* (2006.01)
*F01N 3/18* (2006.01)

(52) U.S. Cl. .............. 701/111; 701/103; 701/110; 123/192.1; 60/285

(58) Field of Classification Search .............. 123/198 F, 123/192.1, 481; 701/22, 101–105, 110–115; 60/274, 277, 285; 477/3; 180/65.2, 65.3
See application file for complete search history.

(56) References Cited

U.S. PATENT DOCUMENTS

| | | | |
|---|---|---|---|
| 5,447,137 A | 9/1995 | Asano et al. | |
| 5,967,940 A * | 10/1999 | Yamaguchi | 701/111 |
| 6,079,204 A | 6/2000 | Sun et al. | |
| 6,253,546 B1 | 7/2001 | Sun et al. | |
| 6,324,835 B1 | 12/2001 | Surnilla et al. | |
| 6,520,879 B2 * | 2/2003 | Kawabata et al. | 180/65.2 |
| 6,570,265 B1 * | 5/2003 | Shiraishi et al. | 180/65.2 |
| 6,947,827 B2 * | 9/2005 | Fuse et al. | 701/110 |
| 7,225,782 B2 * | 6/2007 | Pallett et al. | 123/192.1 |
| 7,228,926 B2 * | 6/2007 | Takami et al. | 180/65.2 |
| 2004/0134696 A1 | 7/2004 | Corcione et al. | |
| 2004/0187483 A1 | 9/2004 | Dalla Betta et al. | |
| 2005/0003927 A1 | 1/2005 | Asakawa et al. | |

(Continued)

FOREIGN PATENT DOCUMENTS

EP 0701050 4/2002

(Continued)

OTHER PUBLICATIONS

Andrew Burke et al., "Feasible Cafe Standard Increases Using Emerging Diesel and Hybrid-Electric Technologies for Light-Duty Vehicles in the United States", Institute of Transportation Studies, University of California, Davis, California, www.its.ucdavis.edu/, 21 pages.

(Continued)

*Primary Examiner*—Willis R Wolfe, Jr.
(74) *Attorney, Agent, or Firm*—Allan J. Lippa; Alleman Hall McCoy Russell & Tuttle LLP (57) ABSTRACT

A vehicle system, comprising of an engine with a first cylinder and a second cylinder operating with different engine torques, a motor coupled to said engine capable of absorbing torque and providing torque, and a controller for varying torque of said motor to compensate for said torque difference so that a total engine and motor torque operates with increased balance.

20 Claims, 6 Drawing Sheets

U.S. PATENT DOCUMENTS

2005/0076887 A1    4/2005    Surnilla

FOREIGN PATENT DOCUMENTS

| | | | |
|---|---|---|---|
| EP | 1134396 | 11/2003 | |
| GB | 2358845 | 8/2001 | |
| JP | 10051906 | 2/1998 | |
| JP | 11350995 A | * 12/1999 | ................ 701/110 |
| JP | 2001295680 A | * 10/2001 | ................ 701/110 |

OTHER PUBLICATIONS

Bin Wu et al., "Optimization of Power Management Strategies for a Hydraulic Hybrid Medium Truck", Proceedings of the 2002 Advanced Vehicle Control Conference, Hiroshima, Japan, Sep. 2002, University of Michigan, Ann Arbor, Michigan, 6 pages.

D. Assanis et al., "An Optimization Approach to Hybrid Electric Propulsion System Design", Automotive Research Center, College of Engineering, Ann Arbor, Michigan, 22 pages.

* cited by examiner

SYSTEM AND METHOD TO CONTROL ENGINE DURING DE-SULPHURIZATION OPERATION IN A HYBRID VEHICLE

FIELD

The present application relates to engines with cylinders producing different torque levels, where the engine is coupled in a hybrid powertrain of a vehicle.

BACKGROUND AND SUMMARY

Engines can use various types of devices to treat emissions in combustion exhaust gasses, one example of which may be referred to as a catalytic converter. However, performance of a catalytic converter may degraded over time for various reasons, including contamination of various materials occupying catalytic sites needed for reducing exhaust emissions.

One approach to remove contamination of an emission control devices includes operating the device at an elevated temperature and controlling an air-fuel ratio of exhaust gasses in the device. In one example, the air-fuel ratio may be rich, and in another example, the air-fuel ratio may be modulated about stoichiometry. Also, one approach to increase the temperature of the device includes operating some cylinders with a lean air-fuel ratio, and some cylinders with a rich air-fuel ratio, where the exhausts are mixed at, in, or upstream of the device to generate exothermic heat.

The inventors herein have recognized a disadvantage with such an approach. For example, the engine cylinders with different air-fuel ratios may produce different levels of combustion torque. While adjustment of spark retard may be used to reduce this effect, such operation can reduce fuel economy. Alternatively, the cylinders can be operated with different amounts of airflow, however this may require special engine hardware, such as differential valve timing or lift control.

One system to address torque imbalances between cylinders (such as from decontamination operation or other differential torque operation) includes a engine with a first cylinder and a second cylinder operating with different engine torques; a motor coupled to said engine capable of absorbing torque and providing torque; and a controller for varying torque of said motor to compensate for said torque difference so that a total engine and motor torque operates with increased balance.

In this way, it is possible to compensate for torque differences between cylinders without requiring spark retard (although spark may be used in some cases, if desired). Further, torque balance may be achieved even when the cylinders having a torque imbalance have a common valve timing or lift.

DETAILED DESCRIPTION

Figure 1:
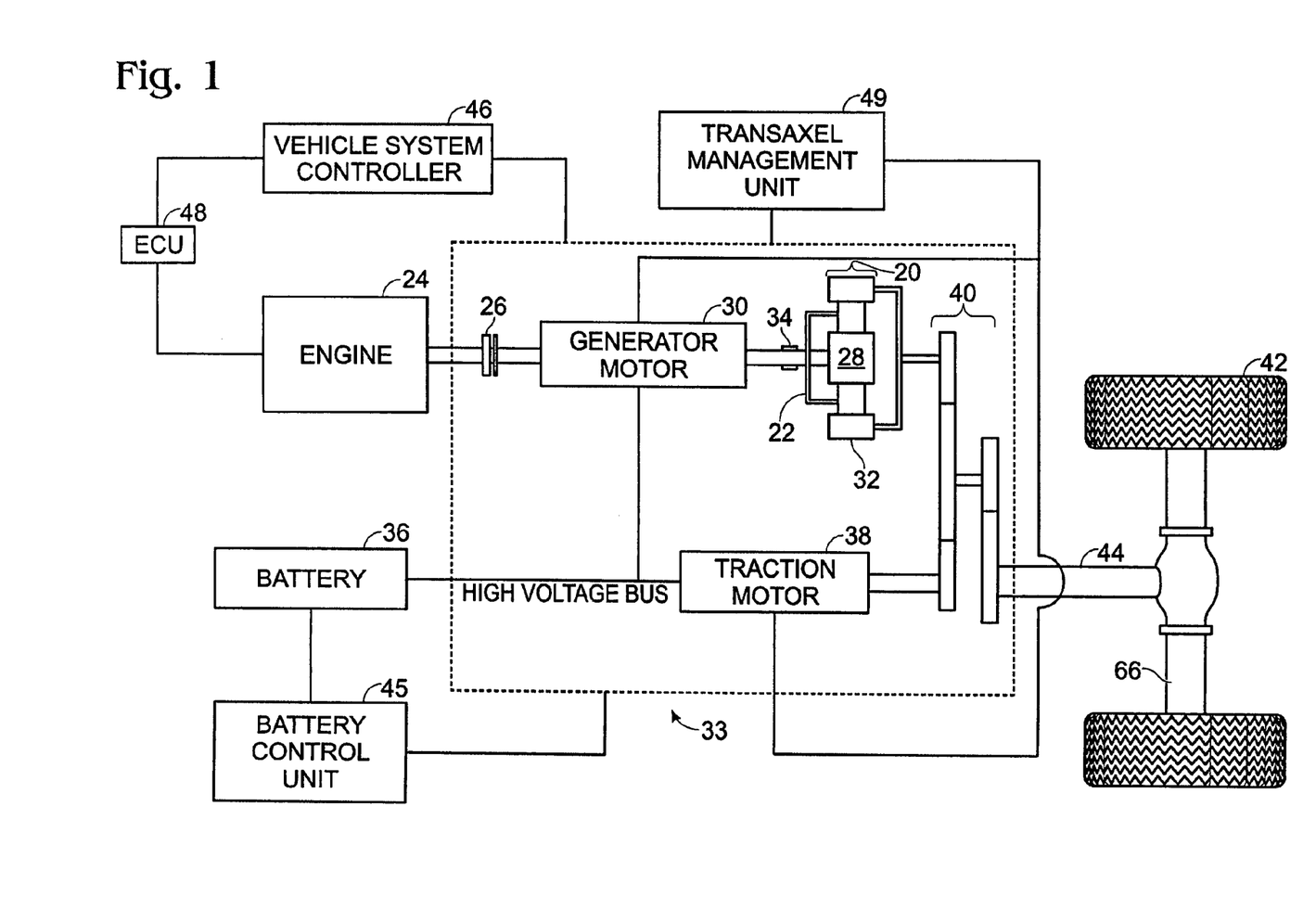
FIG. 1 is a schematic diagram of an example engine in an example hybrid powertrain.

The present disclosure relates to electric vehicles and, more particularly, hybrid electric vehicles (HEVs). FIG. 1 demonstrates just one possible configuration, specifically a parallel/series hybrid electric vehicle (split) configuration.

In an HEV, a planetary gear set 20 mechanically couples a carrier gear 22 to an engine 24 via a one way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. An engine control unit (ECU) 48 connects to the Engine 24 via a hardwire interface (see further details in FIG. 2). In one example, the ECU 48 and VSC 46 can be placed in the same unit, but are actually separate controllers. Alternatively, they may be the same controller, or placed in separate units. The VSC 46 communicates with the ECU 48, as well as a battery control unit (BCU) 45 and a transaxle management unit (TMU) 49 through a communication network such as a controller area network (CAN) 33. The BCU 45 connects to the battery 36 via a hardware interface. The TMU 52 controls the generator motor 30 and the traction motor 38 via a hardwire interface. The control units 46, 48, 45 and 49, and controller area network 33 can include one or more microprocessors, computers, or central processing units; one or more computer readable storage devices; one or more memory management units; and one or more input/output devices for communicating with various sensors, actuators and control circuits.

Figure 2:
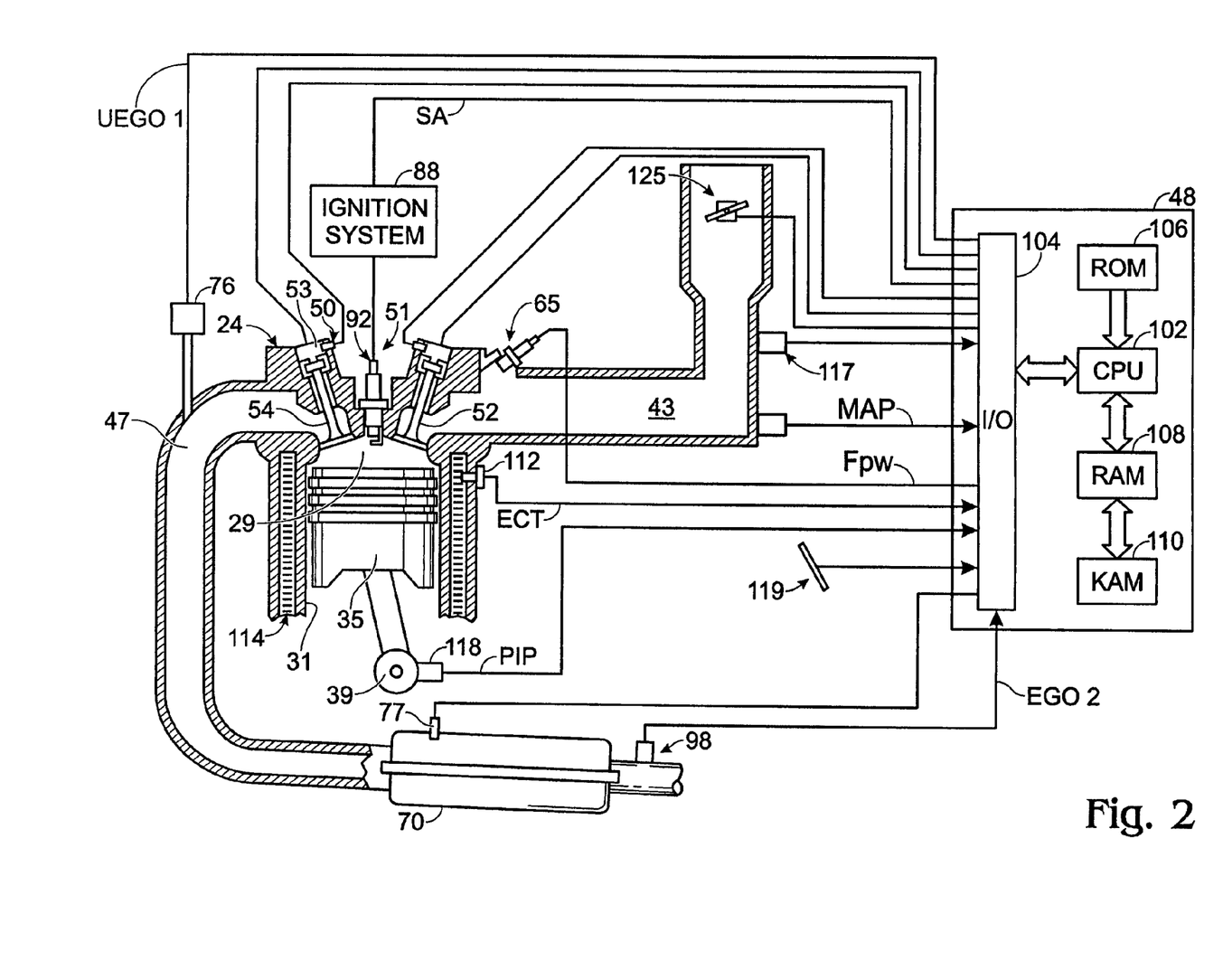
FIG. 2 is a schematic diagram of an example engine, intake system, and exhaust system.

FIG. 2 shows an example engine and exhaust system that may be used as engine 24. Internal combustion engine 24, comprising a plurality of cylinders, one cylinder of which is shown in FIG. 2, is controlled by electronic engine controller 48. Engine 24 includes combustion chamber 29 and cylinder walls 31 with piston 35 positioned therein and connected to crankshaft 39. Combustion chamber 29 is shown communicating with intake manifold 43 and exhaust manifold 47 via respective intake valve 52 and exhaust valve 54. Each intake and exhaust valve is operated by an electromechanically controlled valve coil and armature assembly 53. Armature temperature is determined by temperature sensor 51. Valve position is determined by position sensor 50. In an alternative example, each of valves actuators for valves 52 and 54 has a position sensor and a temperature sensor. In an alternative embodiment, cam actuated valves may be used with or without variable cam timing or variable valve lift.

In one example, engine 24 can be an inline engine (with four, six, or another number of cylinders), where in the case of cam actuated valves, each cylinder of the engine may have a common valve timing. Alternatively, a V-type engine may be used where banks of cylinders have common valve timing for valves with a common cam actuated system.

Intake manifold 43 is also shown having fuel injector 65 coupled thereto for delivering liquid fuel in proportion to the pulse width of signal FPW from controller 48. Fuel is delivered to fuel injector 65 by fuel system (not shown) including a fuel tank, fuel pump, and fuel rail (not shown). Alternatively, the engine may be configured such that the fuel is injected directly into the engine cylinder 29, which is known to those skilled in the art as direct injection (not shown). In addition, intake manifold 43 is shown communicating with optional electronic throttle 125.

Distributorless ignition system 88 provides ignition spark to combustion chamber 30 via spark plug 92 in response to controller 48. Universal Exhaust Gas Oxygen (UEGO) sensor 76 is shown coupled to exhaust manifold 47 upstream of catalytic converter 70. Alternatively, a two-state exhaust gas oxygen sensor may be substituted for UEGO sensor 76. Two-state exhaust gas oxygen sensor 98 is shown coupled to exhaust manifold 47 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof. Converter 70 can include multiple catalyst bricks, in one example. In another example, multiple emission control devices, each with multiple bricks, can be used. Converter 70 can be a three-way type catalyst in one example.

Controller 48 is shown in FIG. 2 as a conventional microcomputer including: microprocessor unit 102, input/output ports 104, and read-only memory 106, random access memory 108, 110 keep alive memory, and a conventional data bus. Controller 48 is shown receiving various signals from sensors coupled to engine 24, in addition to those signals previously discussed, including: engine coolant temperature (ECT) from temperature sensor 112 coupled to cooling sleeve 114; a position sensor 119 coupled to an accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In one aspect of the present description, engine position sensor 118 produces a predetermined number of equally spaced pulses every revolution of the crankshaft from which engine speed (RPM) can be determined.

In an alternative embodiment, a direct injection type engine can be used where injector 66 is positioned in combustion chamber 29, either in the cylinder head similar to spark plug 92, or on the side of the combustion chamber.

In one embodiment, engine 24 can be operated with lean combustion, where the exhaust is treated by an emission control device such as a lean NOx trap. Such a device operates to store oxidants, including NOx, during lean operation, and then reacts to the stored oxidants with reductants generated by temporary rich operation. However, in vehicles equipped with such an emission control device, sulfur in the fuel can eventually reduce the capacity/efficiency of the device by taking up sites that would otherwise be used to trap/store/convert NOx. In such a case, (e.g., when the device has lost a certain amount of capacity/efficiency), the engine can be operated to reduce the sulfur contamination (a DeSOx mode). One method to reduce such contamination involves increasing the device temperature and providing alternating lean and rich exhaust gasses. Various methods are available to increase exhaust heat, such as by running one bank (or group) of cylinders rich and another bank (or group) of cylinders lean in order to heat the device to 625-650 degrees and then bias the air/fuel rich in order to remove the sulfur in the form of H2S and SO2. The benefit of this approach is that the torque curve is relatively flat when rich of stoichiometry, which allows for adjustment of the tailpipe air-fuel ratio via the rich bank without impacting the overall engine torque significantly. However, a disadvantage of such an approach is that torque can drop off significantly on the lean side of stoichiometry, at least under some conditions. In the case where airflow to each bank is not independently controlled, running one bank rich and the other lean can result in a torque imbalance from bank to bank which may have a negative impact on engine noise, vibration, and harshness (NVH).

As noted above, any number of different engine types may be used. In one example a v-type engine may be used where there are four cylinders in each bank. In one example, the cylinders may be grouped by bank. In another example, two cylinders from each bank may be grouped together, thus again generating two groups of four cylinders each. In another example, an inline engine may be used, such as an inline four cylinder engine or an inline six cylinder engine. In any case, the engine may operate with two groups of cylinders, where the first group operates lean and the second group operates rich to generate exhaust heat for remove sulfur contamination, but creating a potential cylinder torque imbalance. In one example, such operation is carried out until a catalyst temperature reaches a desulfurization temperature, at which point the temperature is maintained by such operation but the overall air-fuel ratio may be oscillated between lean and rich to further reduce contamination.

In another example, cylinders may be grouped and operated with disparate ignition timings, where a first group operates with significantly retarded ignition timing (e.g., more than 20 degrees after top dead center), while a second group operates with less retarded timing. In this way, accurate torque control from the second group may be achieved, while large heat generation from the first group may be achieved.

Figure 3:
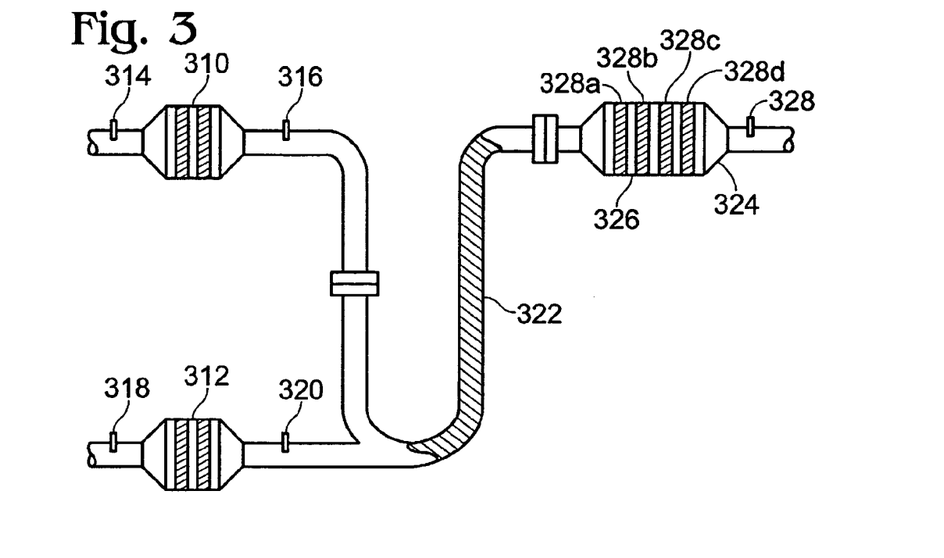
FIG. 3 is a schematic diagram of an example engine and exhaust system configuration.

FIG. 3 shows additional details of one example exhaust configuration involving sulfur removal of an emission control device in a Y-pipe configuration. In this example, upstream three-way catalyst 310 is coupled to a first group of cylinders, and upstream three-way catalyst 312 is coupled to a second group of cylinders. An upstream linear air-fuel sensor 314 and downstream switching exhaust gas sensor 316 are also shown relative to device 310. Likewise, an upstream linear air-fuel sensor 318 and downstream switching exhaust gas sensor 320 are shown relative to device 312. Alternatively, either one or both of the upstream air-fuel sensors 314 and 318 could be switching exhaust gas sensors. The output gasses of devices 310 and 312 are joined in a y-pipe configuration and mix in section 322 of the exhaust pipe before entering downstream lean NOx trap 324. In this example, a temperature sensor 326 is shown coupled between bricks 328A-D, and specifically between bricks A and B. Finally, an integrated linear air-fuel ratio and NOx sensor 328 is shown downstream of device 326.

One approach to managing such torque imbalances between different cylinder groups (e.g., between cylinder banks) uses spark retard on the rich group (assuming common airflow to the two groups). In this approach, airflow is set to provide the desired engine torque on the lean group. On the rich group this would result in a higher than desired engine torque and potential NVH issues. In order to match the lean bank torque, spark retard is used on the rich bank cylinders. This spark retard on the rich group can result in a small loss of fuel economy. As described below, various approaches may be used in place of, or in addition to, such spark retard to reduce this fuel economy loss.

Note that different levels of spark retard may be used between a rich and lean cylinder. For example, under some conditions, there may be little to no spark retard from optimal timing on a rich cylinder or bank (while spark retard may or may not be used on a lean cylinder or bank), an then engine firing order timed torque pulses from the motor may be used to balance the final output torque to the driveline.

Another approach to managing torque imbalances between different cylinder groups (e.g., between cylinder banks) uses differential airflow to the groups. Such operation may be used where the two groups have independently controllable valve timing, for example. In other words, where the two groups constitute two banks of a V-engine, and each bank has variable intake valve timing, for example, the banks can be operated with differential valve timing (and thus differential airflow) to balance cylinder torques. While this approach can reduce the fuel economy penalty of spark retard, it can be dependent on engine configuration, and many engine cylinder groups are not configured with independent valve control. For example, on a V-8 engine, cylinders may be grouped across banks, and thus even if each bank has independent valve timing control, differential airflow between the groups may not be possible.

Still another approach to managing such torque imbalances incorporates adjustment a secondary torque source, such as a motor used in a hybrid powertrain. Various other types of secondary torque sources may be used, such as, for example, a starter-alternator or transaxle motor. In this example, the secondary torque source provides another option for managing engine torque during conditions where at least two cylinders have disparate torque production. Torque adjustments (to reduce or increase torque) can be achieved via the secondary torque source instead of, or in addition to, spark retard. In this way, numerous options are available to manage cylinder torque imbalances. These include:

Absorbing torque in the secondary torque source to counteract cylinders generating increased engine torque;

Providing torque in the secondary torque source to counteract cylinders generating decreased engine torque;

Combinations thereof, including varying the levels of absorbing/providing torque, along with the cylinder air amount, such as based on battery state of charge and/or other operating conditions.

By using any one or more of the above options, it can be possible to manage energy flow while providing the desired engine torque balance during conditions of unequal engine combustion torque. For example, the amount of spark retard may be reduced with the addition of a secondary torque source for assisting managing engine torque during cylinder imbalances, such as a DeSOx mode. Further, based on a battery State-of-Charge (SOC), secondary torque source capacity, and other engine conditions, energy flow can be managed while providing the desired engine torque control.

Figure 4:
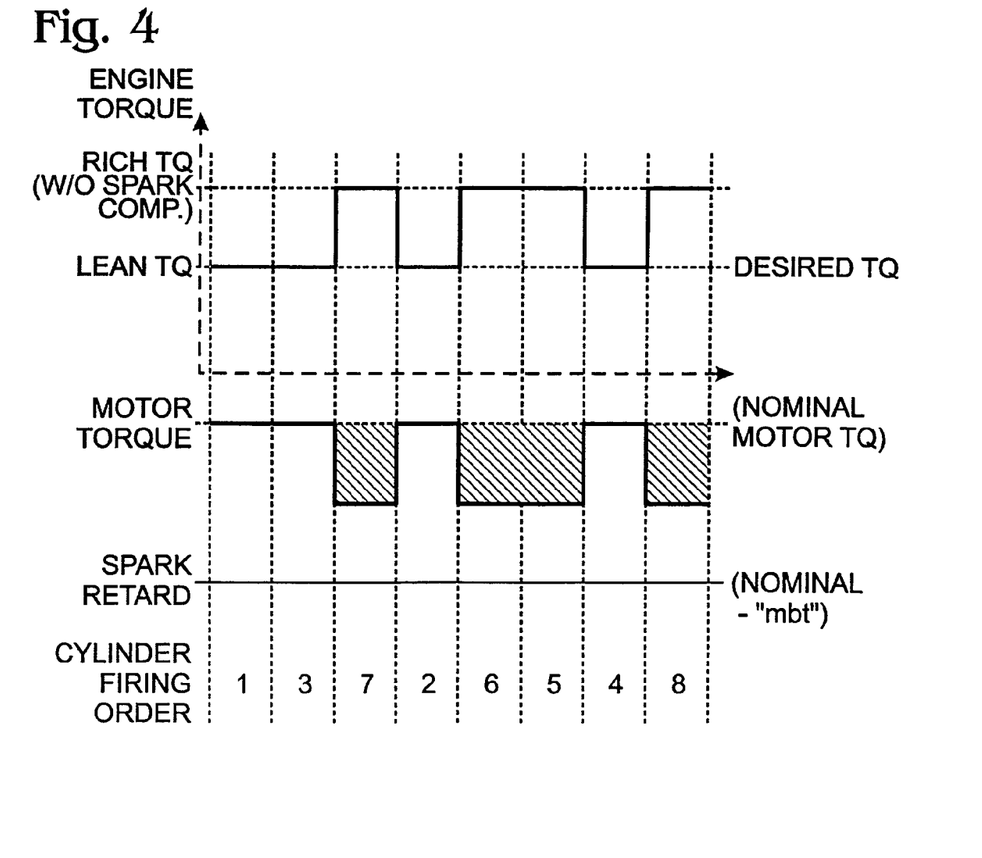
FIGS. 4-6 are graphs showing example operation according to various example embodiments.
Figure 5:
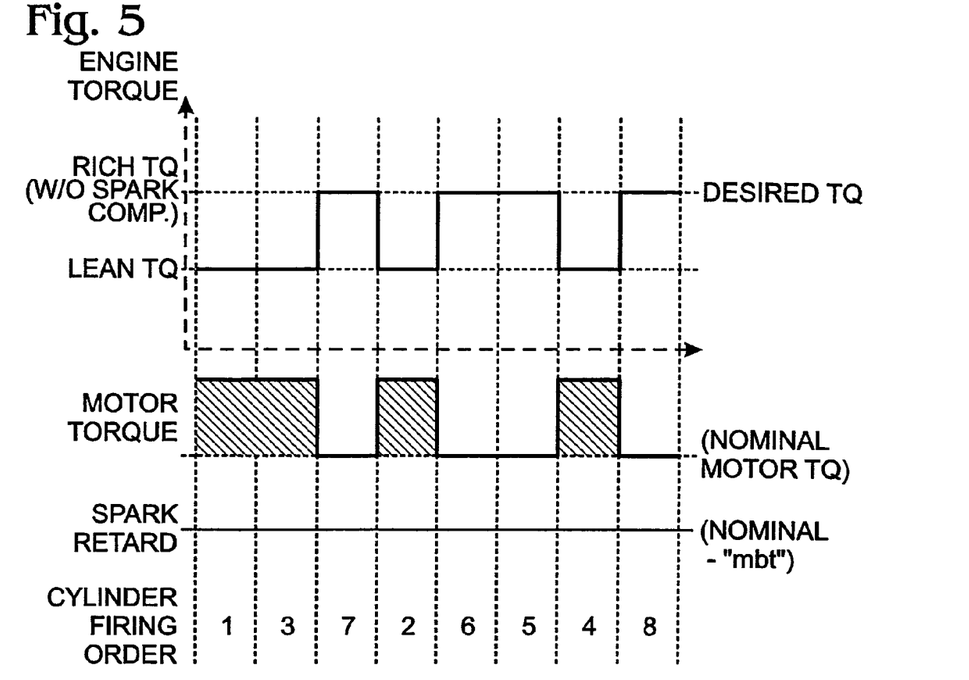
Figure 6:
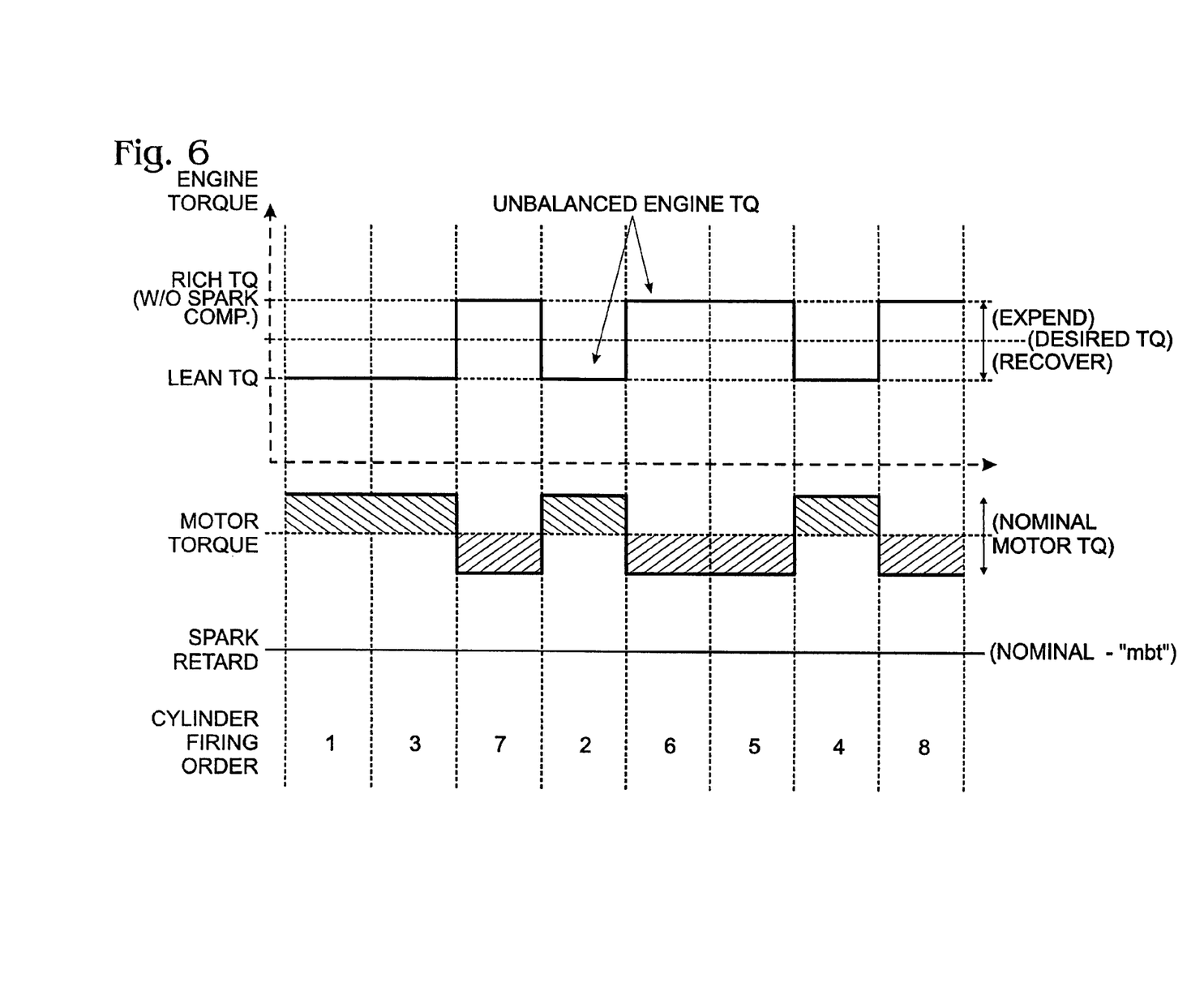

Referring now to FIG. 4-6, various examples are shown illustrating different cylinder balancing control strategies with energy recovery/negative secondary torque and energy usage/positive secondary torque. In these examples, an electric motor is given as an example secondary torque source.

FIG. 4 shows an example in which energy is absorbed through the electric motor to provide energy recovery during cylinder torque balancing. The absorbed energy may then be available to be stored, such as in a battery. In particular, for energy recovery, airflow is set to provide the desired average per cylinder torque from the lean cylinders (where the same amount of airflow on the rich cylinders will produce higher than desired torque). Rather than relying solely on spark retard on the rich cylinders, the secondary torque source can be used to counter-act the torque as shown below in FIG. 4. In this case, the secondary motor will be run in the negative direction, thus "recovering" or storing the excess torque/energy back into the battery from the rich cylinders, where such energy recovery is indicated by the hatched regions of FIG. 4.

FIG. 4 also illustrates timing of motor torque for an example V-8 engine configuration, in which the firing order is L-L-R-L-R-R-L-R (starting with cylinder 1), where L indicates a lean bank, and R indicates a rich bank. Thus, cylinders 1-4 represent an example first group, and cylinders 5-8 represent an example second group. Therefore, the motor generates two shorter pulses of energy absorption, and one longer pulse of energy absorption in this example.

While the approach of FIG. 4 provides efficient use of the temporary engine output increase, additional factors can determine the amount of motor torque absorption/storage, such as, for example, battery state of charge (SOC). For example, energy absorption via the motor may be advantageous during low battery state of charge conditions. Also, as noted above, ignition timing adjustments may be used, some combination of negative motor torque and spark retard may be used, or positive motor torque may be used (see below), or combinations thereof.

Thus, while the example of FIG. 4 shows that spark retard is totally replaced by the secondary motor recovering energy by applying a negative torque, other approaches may also be used. In cases where the amount of energy recovery is limited (i.e. high battery state of charge or motor limitations—maximum negative torque limits or dynamic response of torque motor), it may be advantageous to produce the desired negative torque through a combination of spark retard and negative motor torque. This capability may be particularly advantageous when performing DeSOx events with a starter-alternator combination where the starter-alternator may have less torque capability and less energy storage capability within the battery.

Referring now to FIG. 5, an example approach is shown in which energy may be provided through the electric motor during cylinder torque balancing. In this example, airflow may be set to provide the desired average per cylinder torque from the rich cylinders. Again, the same amount of airflow on the lean cylinders will produce a lower than desired torque. In this case, the secondary torque source may be used to make up the torque loss by putting energy back into the system during the lean combustion events as shown in FIG. 5. In this case, the secondary motor will be run in the positive direction, thus expending energy from the battery to cover the lean cylinders lack of torque. This may be desirable under conditions where the battery state of charge is high. However, in other conditions, the approach above where energy is recovered may be preferable.

Also, while not shown in this example, further adjustments to ignition timing may be used, if desired. Such an approach may be particularly useful in a starter-alternator combination where the starter-alternator may have less torque capability and less energy storage capability within the battery.

Note that other parameters may also influence whether the motor is used to supply or absorb energy, whether ignition timing retard is used, or whether to use the motor at all, or whether to select from combinations thereof. For example, ignition timing retard may affect catalyst temperature and emissions, and thus such factors may be used to select the transition compensation strategy. For example, in FIG. 6, the motor both supplies and absorbs torque during cylinder balancing (where hatching to the right represents expending energy, while hatching to the left represent energy recovery). The amount of supply/absorption can be adjusted (based on operating conditions such as battery state of charge, motor torque capability, desired engine torque, etc.), or can be selected to be energy neutral. An energy neutral transition can be one in which the amount of energy supplied by the motor approximately equals the amount of energy stored, which may be desired when battery state of charge is at a desired level.

In this approach, airflow can be set somewhere between that required for the lean or rich cylinders to make the desired net engine torque. As both sets of cylinders will be in error, the secondary torque source will be required to make up the deficiency from the lean cylinders and counter act the excess torque from the rich cylinders. FIG. 6 shows an example for scoping the net energy during a DeSOx mode.

Thus, by changing the airflow, it is possible to "scope" or control the net energy flow from 100% regen/recovery to neutral to 100% negative energy flow. Scoping the energy flow control to a more neutral stance as shown herein may also have the advantage of requiring a lower net torque correction from the auxiliary motor that makes it suited for applications with les motor dynamic range.

Note that in the preceding cases, for illustrative purposes, the nominal secondary engine torque condition is shown to be zero. However, the approaches can be applied to other conditions, such as non-zero nominal torque. In such a case, the motor may provide less positive torque (less energy) during a cylinder balancing rather than actually recovering energy as shown in the above examples.

Figure 7:
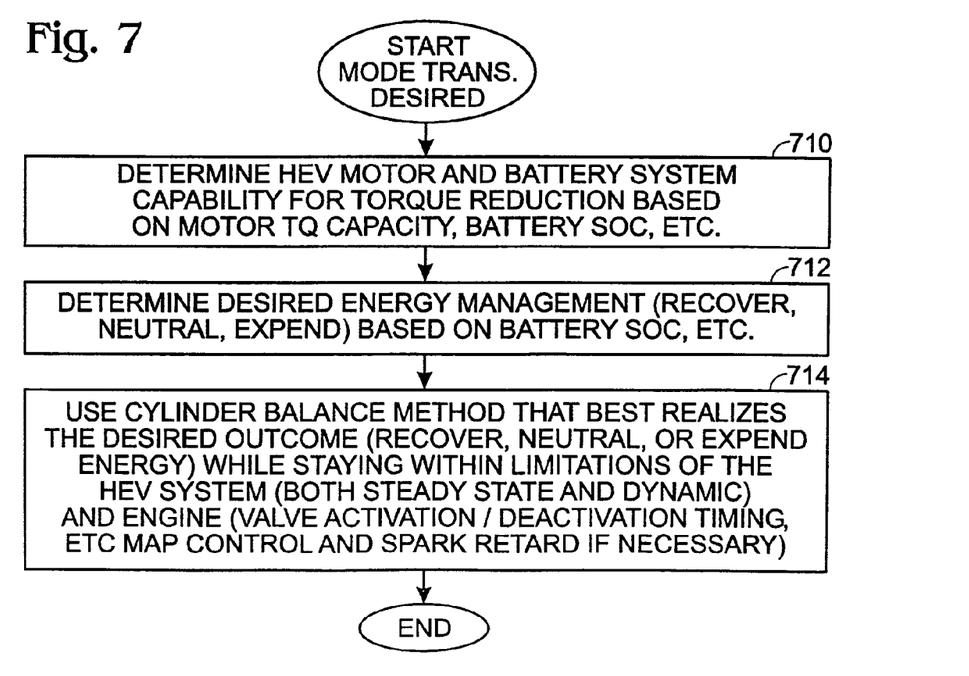
FIGS. 7-8 are high level flowcharts showing an example embodiment of operation.
Figures 8, 9:
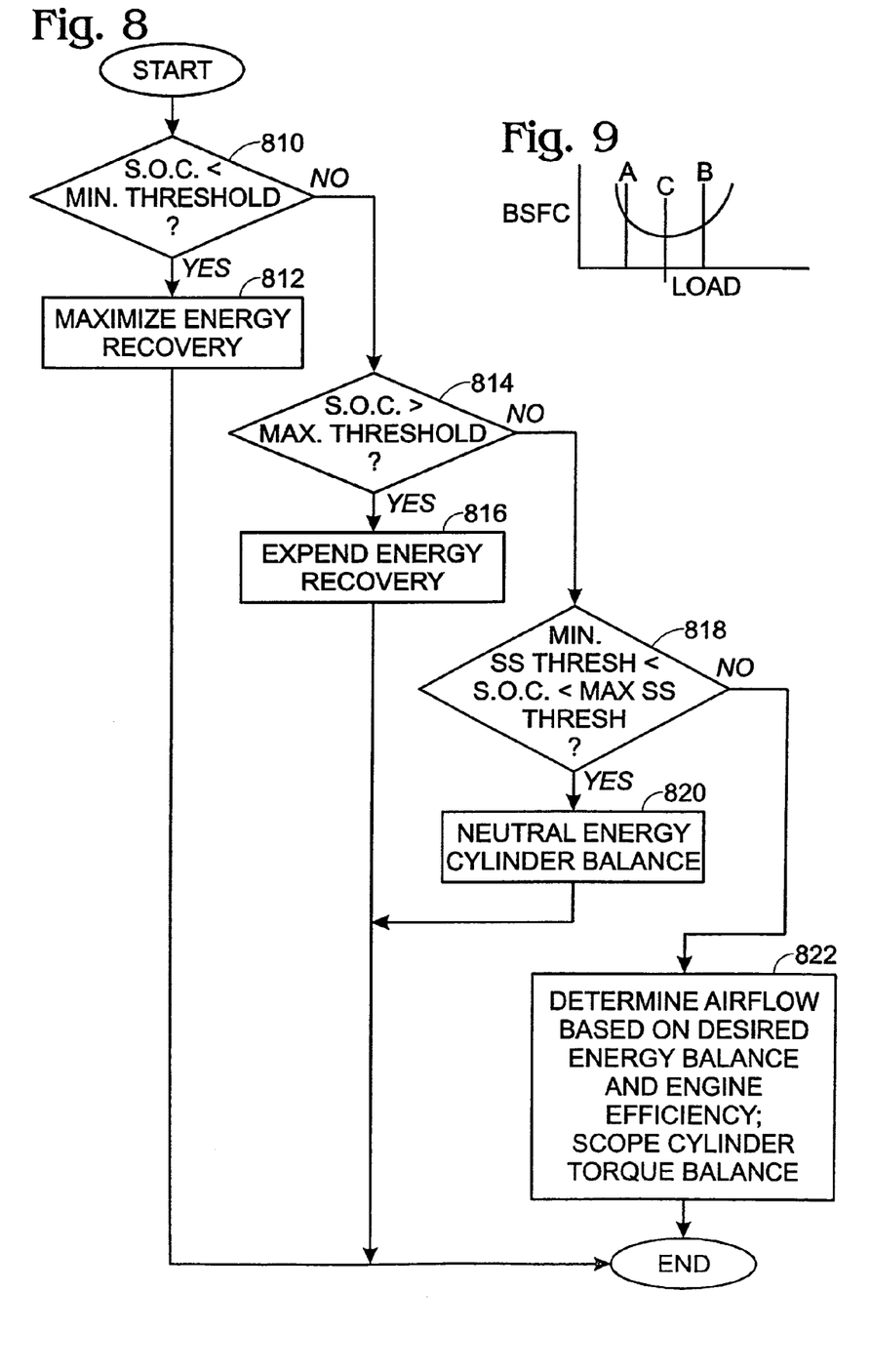
FIG. 9 is a graph showing engine efficiency variation with airflow.

Referring now to FIGS. 7-8, example routines are described for controlling cylinder torque balancing. As shown above, several different examples are described for maintaining the desired engine torque. As described below, the approach used to maintain torque during the transition can vary depending on battery SOC, secondary motor torque capacity, secondary motor dynamic torque response, and/or other relevant system conditions.

The flow chart of FIG. 7 begins with an indication from other portions of a powertrain control strategy that cylinder balancing is desired, e.g., that a DeSOx mode is in progress. The first step (710) is to determine the effective constraints of the HEV motor and battery to absorb or add torque to the system. The next step (712) is to select a combination of ignition timing retard, throttle adjustment (before, after, and/ or during the transition), and motor torque adjustment (absorption, supply, or combinations thereof) (before, after, and/ or during the transition). For example, step 712 may determine whether energy should be stored, spent, or maintained substantially neutral. This determination can be based on conditions such as battery SOC. However, conditions such as a high battery SOC may result in the selection of still another mode (see below). In one approach, energy recovery is nominally selected, except when battery SOC is above a threshold or the system is unable to absorb the required energy. In another approach, the routine has a preset map of the type of compensation to use depending on engine speed/ load/torque conditions to minimize engine torque disturbances irrespective of engine storage/release.

Continuing with FIG. 7, in step 714 the mode transition method determined in step 712 is activated and the desired torque contribution from the HEV motor and engine (valve activation/deactivation timing, ETC MAP control, and/or spark retard, if necessary) is determined. Further, additional adjustments may be added to account for various system limitations (both steady state and dynamic).

Note also that engine efficiency can impact a selection between whether to use energy recovery, to expend energy, or control between the two. For example, depending on the current engine operating condition of speed and load, the efficiency of engine operation may increase or decreases with increases in the load as is represented in the FIG. 9. If operating at point A, increasing the load for a given engine rpm condition results in increased engine efficiency. In this case, it is advantageous to use method energy recovery, wherein the load in increased to compensate for lean bank and additional torque is absorbed by the battery. If the engine is operating at point B, then expending energy may be preferable as the increase in load would deteriorate the efficiency of engine operation. If the engine is operating at point C, then scoped neutral may be preferable because the engine is already operating at the peak efficiency point and would be preferable to be left at that state of operation. Of course, the above efficiency considerations may be used as a primary selection unless battery state of charge is outside a selected range, and then battery state of charge may override mode selection.

Referring now to FIG. 8, a routine is shown providing an example approach that can be used in place of step 712. In this example, the amount of motor torque supplied/absorbed (and optionally the timing of motor torque adjustments) can be varied as the batter SOC varies. First, in step 810, the routine determines whether battery SOC is below a minimum threshold. If so, then the routine continues to maximize the energy recovery (absorb engine torque) in 812. Otherwise, in step 814, the routine determines whether battery SOC is greater than a maximum threshold. If so, then the routine continues to step 816 to expend energy during the cylinder balancing (supply motor torque). Otherwise, in step 818 the routine determines if the battery SOC is within a desired steady state operating conditions. If so, a neutral energy mode is selected in step 820. Otherwise, a default response where the amount of torque supplies/absorbed is may be used to control the battery SOC to a desired value in step 822, along with adjustment of engine airflow to a desired value to enable the scoped motor control. In other words, the routine determines the airflow load at which to run the engine for the given engine speed. As noted above with regard to FIG. 9, the routine attempts to operate near the minimum BSFC. Once this airflow load is determined, the "scoped" energy management strategy described herein may be used to maintain the drivers requested engine torque while operating the engine at peak efficiency.

As will be appreciated that the routines described in FIGS. 7-8 and elsewhere herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages described herein, but are provided for ease of illustration and description. Although not explicitly illustrated, one of ordinary skill in the art will recognize that one or more of the illustrated steps or functions may be repeatedly performed depending on the particular strategy being used.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the valve operating patters, cylinder operating patterns, cylinder stroke variations, valve timing variations, and/or properties may be claimed through amendment of the present claims or through presentation of new claims in this or a related application. Such claims, whether broader, narrower, equal, or different in scope to the original claims, also are regarded as included within the subject matter of the present disclosure.

This concludes the description. The reading of it by those skilled in the art would bring to mind many alterations and modifications without departing from the spirit and the scope of the disclosure. For example, I3, I4, I5, V6, V8, V10, and V12 engines operating in diesel, natural gas, gasoline, or alternative fuel configurations could be used to advantage.

The invention claimed is:

1. A vehicle system, comprising:
   an engine with a first cylinder and a second cylinder operating with different engine torques;
   a motor coupled to said engine capable of absorbing torque and providing torque; and
   a controller for varying torque of said motor to compensate for said torque difference so that a total engine and motor torque operates with increased balance, where said controller varies torque of said motor based on battery state of charge.

2. The system of claim 1 wherein said controller determines whether to increase or decrease motor torque depending on battery state of charge.

3. A vehicle system, comprising:
   an engine with a first cylinder and a second cylinder operating with different engine torques;
   a motor coupled to said engine capable of absorbing torque and providing torque; and
   a controller for varying torque of said motor to compensate for said torque difference so that a total engine and motor torque operates with increased, where said first cylinder operates with ignition timing more retarded than said second cylinder.

4. The system of claim 3 wherein said first cylinder operates with ignition timing more than 20 degrees after top dead center.

5. A computer storage medium having stored data representing instructions executable by a computer to control a vehicle system, the vehicle system comprising a engine having at least a first cylinder and a second cylinder and a motor coupled to said engine capable of absorbing torque and producing torque, the medium comprising:
   code for operating said first cylinder lean and said second cylinder rich to generate exhaust heat to reduce sulfur contamination of an emission control device;
   code for, during said reduction of sulfur contamination, varying torque of said motor to compensate for a torque difference between said first and second cylinders;
   code for varying whether said motor produces or absorbs torque based on battery condition; and
   code for varying an engine airflow as said motor varies between producing and absorbing torque.

6. The medium of claim 5 wherein absorbed torque generates energy stored in a battery.

7. A vehicle system, comprising:
   an engine capable of operating with a first cylinder generating a first torque, and a second cylinder generating a second torque, where said first torque is greater than said second torque;
   a motor coupled to said engine capable of absorbing torque and producing torque; and
   a controller for operating said engine with said first cylinder generating said first torque and said second cylinder generating said second torque, and during said operation, varying torque of said motor to compensate for said torque difference, and varying whether said motor produces or absorbs torque based on an operating condition, said controller further varying said motor torque with an engine firing order.

8. The system of claim 7 where said operating condition includes battery state of charge.

9. The system of claim 7 where said operating condition includes motor torque capacity.

10. The system of claim 7 wherein said first cylinder operates rich and said second cylinder operates lean to generate exhaust heat.

11. The system of claim 7 wherein said operating condition includes an engine operating efficiency, and where said controller adjusts an airflow of the engine based on said engine operating efficiency.

12. A vehicle system, comprising:
    an engine with a first cylinder and a second cylinder operating with different engine torques;
    a motor coupled to said engine capable of absorbing torque and providing torque; and
    a controller for varying torque of said motor to compensate for said torque difference so that a total engine and motor torque operates with increased balance, where said first cylinder operates rich and said second cylinder operates lean.

13. The system of claim 12 wherein varying torque of said motor further comprises temporarily increasing motor torque output.

14. The system of claim 12 wherein varying torque of said motor further comprises temporarily decreasing motor torque output.

15. The system of claim 12 wherein said cylinder operation is performed during a catalyst desulfurization event.

16. The system of claim 12 wherein said controller varies said motor torque with an engine firing order.

17. The system of claim 12 wherein varying torque of said motor further comprises temporarily increasing and temporarily decreasing motor torque output.

18. The system of claim 17 wherein an amount of increase and decrease is based on battery state of charge.

19. The system of claim 12 wherein said controller further adjusts airflow during said cylinder balancing.

20. The system of claim 19 wherein said controller adjusts airflow during said cylinder balancing based on engine operating efficiency.

* * * * *